(12) United States Patent
Sallis (10) Patent No.: US 9,446,809 B2
(45) Date of Patent: Sep. 20, 2016

(54) FRAME COVERING DEVICE WITH AIR VENTS

(71) Applicant: Richard Oneal Sallis, Waterloo, IA (US)

(72) Inventor: Richard Oneal Sallis, Waterloo, IA (US)

( * ) Notice: Subject to any disclaimer, the term of this patent is extended or adjusted under 35 U.S.C. 154(b) by 0 days.

(21) Appl. No.: 14/452,498

(22) Filed: Aug. 5, 2014

(65) Prior Publication Data

US 2016/0039486 A1    Feb. 11, 2016

(51) Int. Cl.
*B60K 11/08*    (2006.01)
*B62J 23/00*    (2006.01)

(52) U.S. Cl.
CPC ........................... *B62J 23/00* (2013.01)

(58) Field of Classification Search
CPC ...................................... B60K 11/08
USPC ................ 180/68.6, 68.4, 908; 296/193.1
See application file for complete search history.

(56) References Cited

U.S. PATENT DOCUMENTS

| | | | | |
|---|---|---|---|---|
| 2,086,172 A * | 7/1937 | Northup | ................ | B60K 11/08 180/68.5 |
| 2,191,599 A * | 2/1940 | Valletta | ................ | B60K 11/08 180/68.1 |
| 2,207,366 A * | 7/1940 | Anderson | ............ | B60K 11/08 180/69.2 |
| 2,218,626 A * | 10/1940 | Snyder | ................ | B60K 11/00 180/69.2 |
| 4,186,817 A * | 2/1980 | Bauer | ................ | B60K 11/08 123/41.58 |
| 4,535,869 A * | 8/1985 | Tsutsumikoshi | ......... | B62K 5/01 180/215 |
| 4,781,258 A * | 11/1988 | Tamura | ................ | B60K 11/06 180/229 |
| 5,215,157 A * | 6/1993 | Teich | ................ | B62D 25/10 180/312 |
| 5,490,574 A * | 2/1996 | Ishiizumi | ................ | F01P 11/12 180/68.1 |
| 6,772,824 B1 * | 8/2004 | Tsuruta | ................ | B60K 11/02 123/41.49 |
| 7,011,360 B2 * | 3/2006 | Lanard | ................ | B60R 19/00 180/68.6 |
| 7,410,019 B2 * | 8/2008 | Kotrla | ................ | B62K 5/01 180/68.4 |
| 7,464,781 B2 * | 12/2008 | Guay | ................ | B60K 11/04 180/215 |
| 8,191,960 B2 * | 6/2012 | Schmitz | ............ | B60J 10/0031 180/69.21 |
| 8,430,195 B2 * | 4/2013 | Jansen | ................ | B62D 25/10 180/69.2 |
| 8,646,555 B2 * | 2/2014 | Reed | ................ | F01P 11/029 180/68.4 |
| 2002/0017408 A1 * | 2/2002 | Oshikawa | ............ | B60K 11/08 180/69.2 |
| 2002/0023792 A1 * | 2/2002 | Bouffard | ................ | B60K 11/04 180/68.4 |
| 2003/0066209 A1 * | 4/2003 | Takezaki | ................ | B60K 11/08 37/197 |
| 2004/0251066 A1 * | 12/2004 | White | ................ | B60R 19/52 180/68.6 |
| 2004/0262061 A1 * | 12/2004 | Bahr | ................ | B60K 11/08 180/69.2 |
| 2009/0058141 A1 * | 3/2009 | Hirukawa | ............ | B60R 19/52 296/193.1 |
| 2010/0147613 A1 * | 6/2010 | Jansen | ................ | B62D 25/10 180/69.2 |
| 2010/0187033 A1 * | 7/2010 | Hayashi | ................ | B60K 11/04 180/68.4 |

* cited by examiner

*Primary Examiner* — Jeffrey J Restifo
(74) *Attorney, Agent, or Firm* — Mark David Torche; Patwrite LLC (57) ABSTRACT

A frame covering device with air vents has an upper frame and a lower frame with vertically oriented air vents disposed between them. An upper flange disposed along a top portion of the upper frame has an attachment tab to attach the frame covering device with air vents to a front shock and steering assembly of a three-wheeled motorcycle. A lower attachment slot is disposed in a lower flange and also attaches to the front shock and steering assembly. The upper and lower frames are aerodynamically shaped to aid in laminar air flow to increase efficiency and to improve the aesthetics of the motorcycle.

4 Claims, 8 Drawing Sheets

PRIOR ART

FRAME COVERING DEVICE WITH AIR VENTS

CROSS REFERENCE TO RELATED APPLICATIONS

This application claims priority to U.S. Provisional Application No. 61/862,410, filed on Aug. 5, 2013. The entirety of the subject matter of these applications is incorporated herein.

BACKGROUND OF THE INVENTION

Description of Related Art

At present there is no known Frame Covering Device with Air Vents invention for a three wheel vehicle that has two wheels in the front using shock and double A-arm assembly for steering.

Currently, a three wheel vehicle's front frame shock and steering assembly is totally exposed, see U.S. Pat. No. 7,464,781 B2, making it difficult to clean of road dirt and bug residue that may accumulate while riding three wheeled vehicles.

There is a need for an esthetically pleasing frame covering device to protect the front wheels of a three wheel vehicle that allows air to flow while not impeding steering or maneuverability and reduces cleaning time.

BRIEF SUMMARY OF INVENTION

Field of the Invention

The present invention relates to a Frame Covering Device and, more particularly, to Frame Covering Device with Air Vents for a novel three wheel vehicle that has two wheels in the front that uses a shock and double A-arm assembly for steering.

The Frame Covering Device with Air Vents is a piece of fabricated material consisting of various angles which can have different openings in the vent areas for air to flow through, it is connected between the upper and lower double A-arm assembly that sits in front of the shock assembly.

The Frame Protective Covering with Air Vents invention will provide protection for the shock and steering assembly of said three wheel vehicle, reducing parts exposure to man-made and natural elements, allowing maximum air flow to both radiators, reducing the overall cleaning time of the steering and shock assembly, and improving the overall appearance.

A frame covering device with air vents has an upper frame and a lower frame with vertically oriented air vents disposed between them. An upper flange disposed along a top portion of the upper frame has an attachment tab to attach the frame covering device with air vents to a front shock and steering assembly of a three-wheeled motorcycle. A lower attachment slot is disposed in a lower flange and also attaches to the front shock and steering assembly. The upper and lower frames are aerodynamically shaped to aid in laminar air flow to increase efficiency and to improve the aesthetics of the motorcycle.

DETAILED DESCRIPTION OF THE INVENTION

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to figures, a frame covering device with air vents 100 is shown having an upper frame portion 105, a lower frame portion 110 and a plurality of vent openings 115. An attachment tab 135 is provided along an upper flange 120 to provide an attachment point for connecting frame covering device with air vents 100 to a three-wheeled motorcycle 180. An attachment slot 130 is provided in lower flange 140 to attach to three-wheeled motorcycle 180. Of course other attachment means may be used to attach frame covering device with air vents 100 to three-wheeled motorcycle 180 as long as frame covering device with air vents 100 is secured to front shock and steering assembly 145 of three-wheeled motorcycle 180 without impeding steering, suspension or braking.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a Frame Covering Device with air vents 100 that includes a sheet of material having a plurality of air vents 115, wherein the sheet of material is folded in such a way to provide a protective covering for the shock and frame arm assembly 145. The Frame Covering Device with Air Vents 100 provides a protective covering for front shock and steering assembly 145 thereby reducing the accumulation of dirt and bug residue. Additionally, as is shown in the figures, upper frame portion 105 and lower frame portion 110 is aerodynamically optimized to allow air to flow in a laminar manner over and under as well as through vent openings 115. This allows frame covering device with air vents to protect front shock and steering assembly 145 without decreasing speed or fuel economy during operation. Additionally, the aesthetics of three-wheel motorcycle is improved as well by partially covering and concealing the normally exposed assembly.

Figure 1:
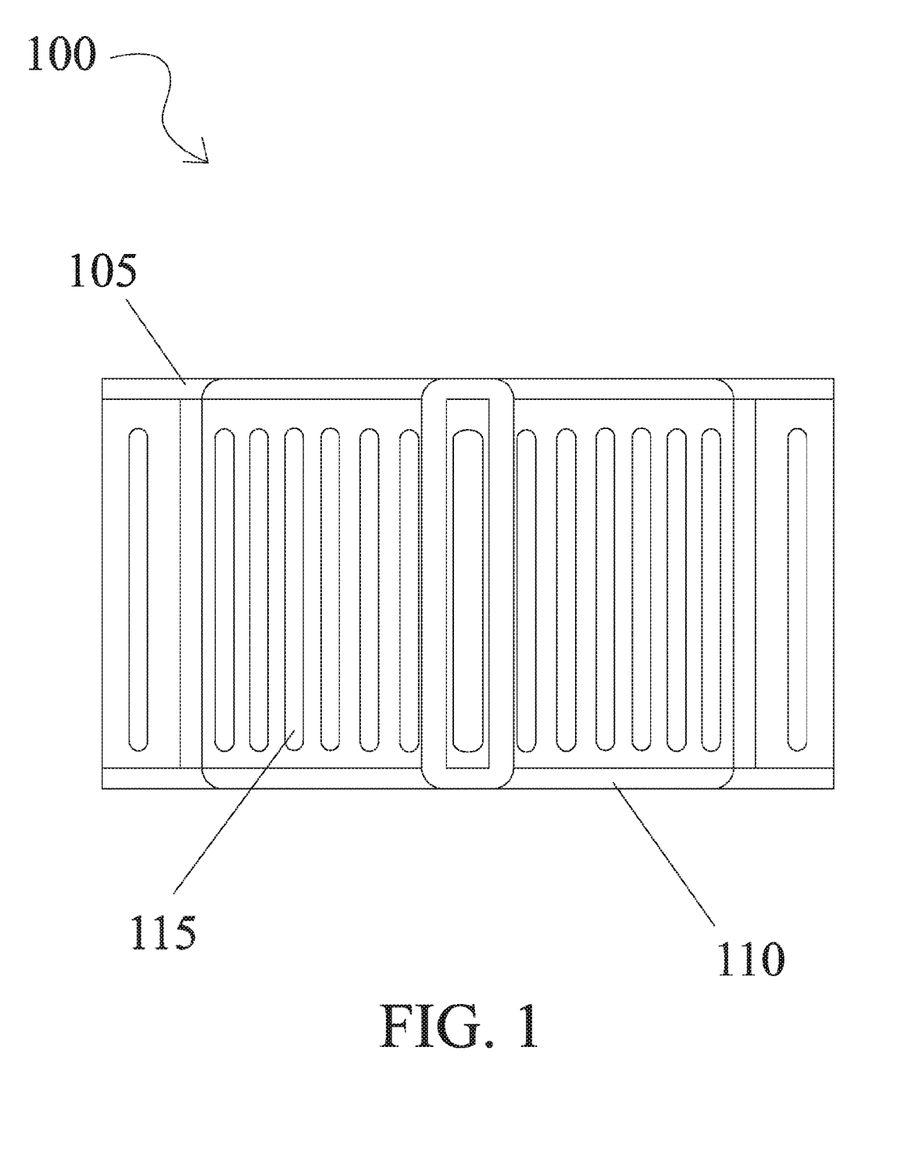
FIG. 1 is a front view of a Frame Covering Device with Air Vents according to an embodiment of the invention.
Figure 2:
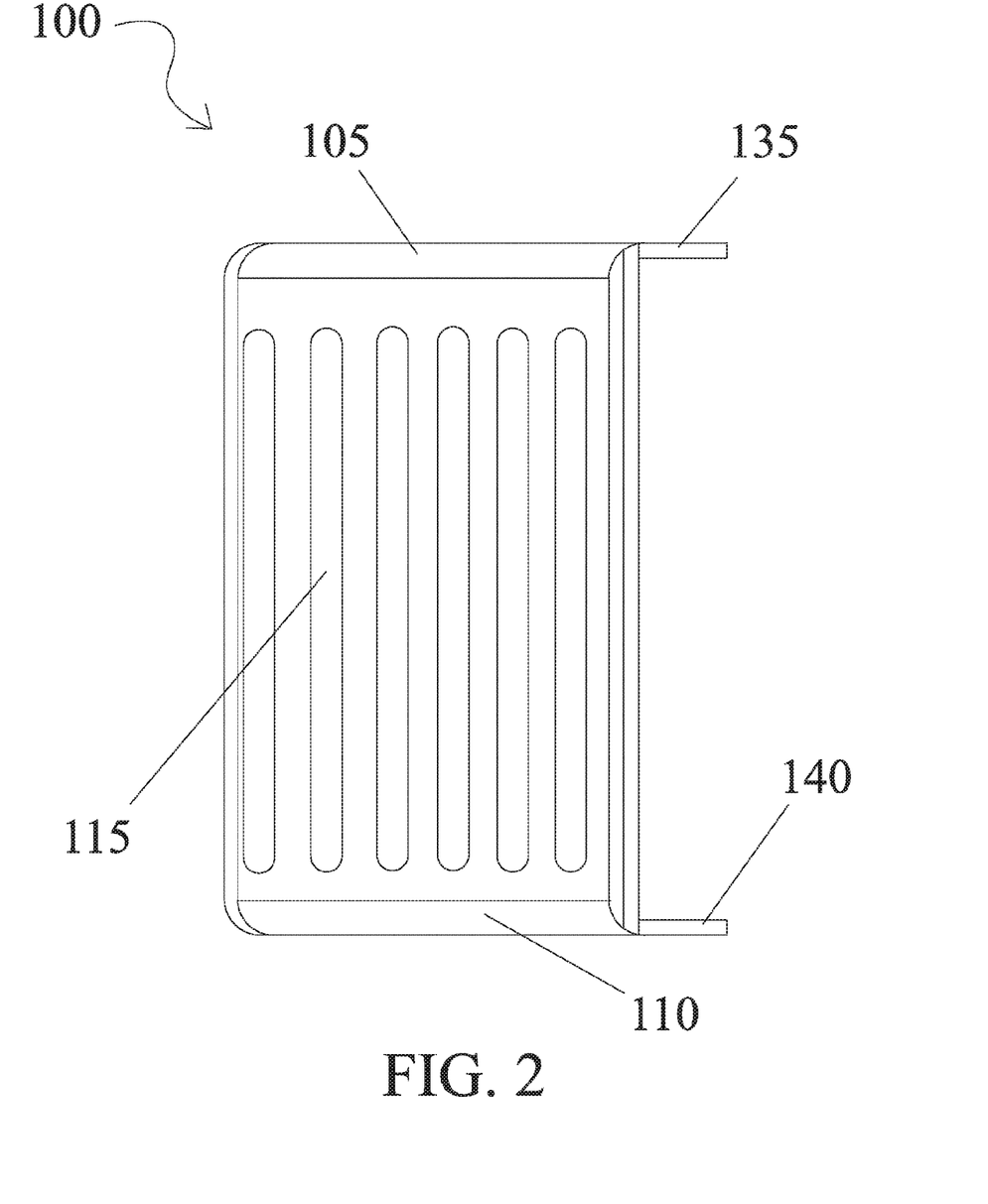
FIG. 2 is a right side view the Frame Covering with Air Vents shown in FIG. 1.
Figure 3:
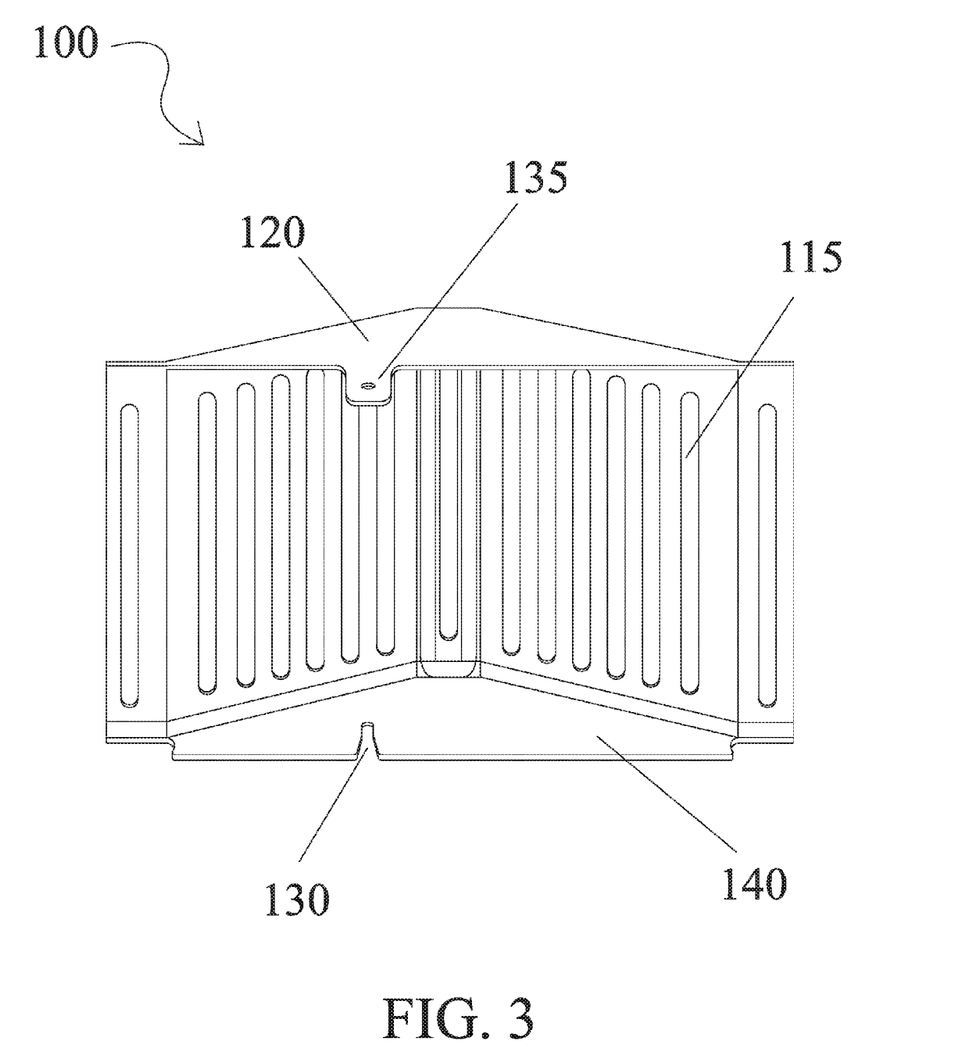
FIG. 3 is a rear perspective view of the Frame Covering Device with Air Vents shown in FIG. 1.
Figure 4:
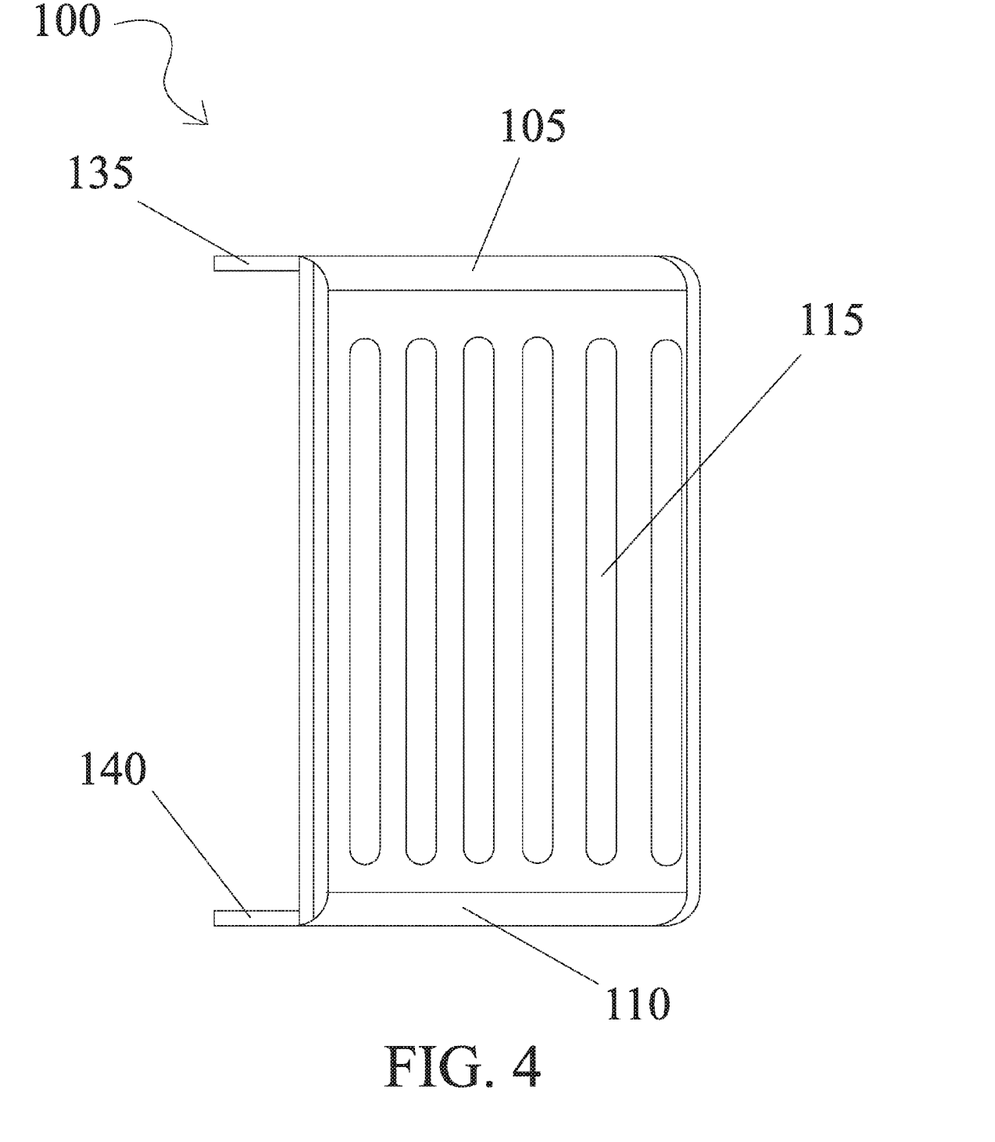
FIG. 4 is a left side view of the Frame Covering Device Air Vents invention shown in FIG. 1.
Figure 5:
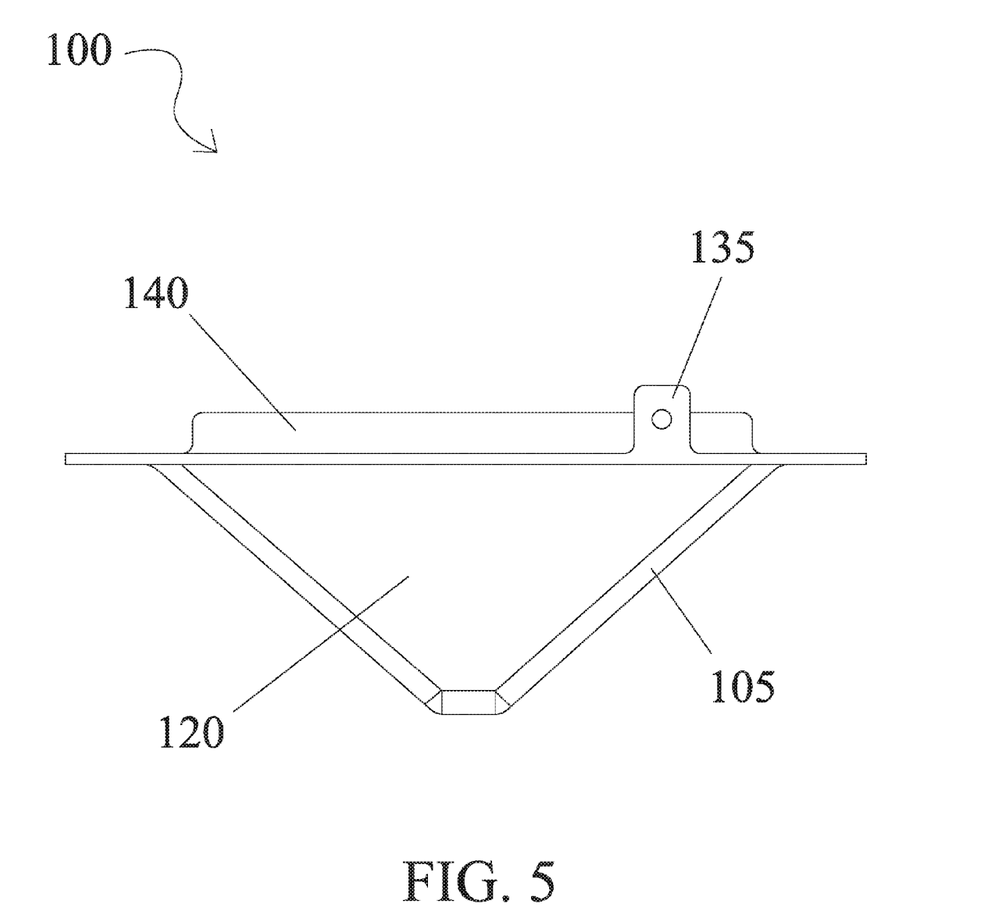
FIG. 5 is a top view of the Frame Covering Device with Air Vents invention shown in FIG. 1.
Figure 6:
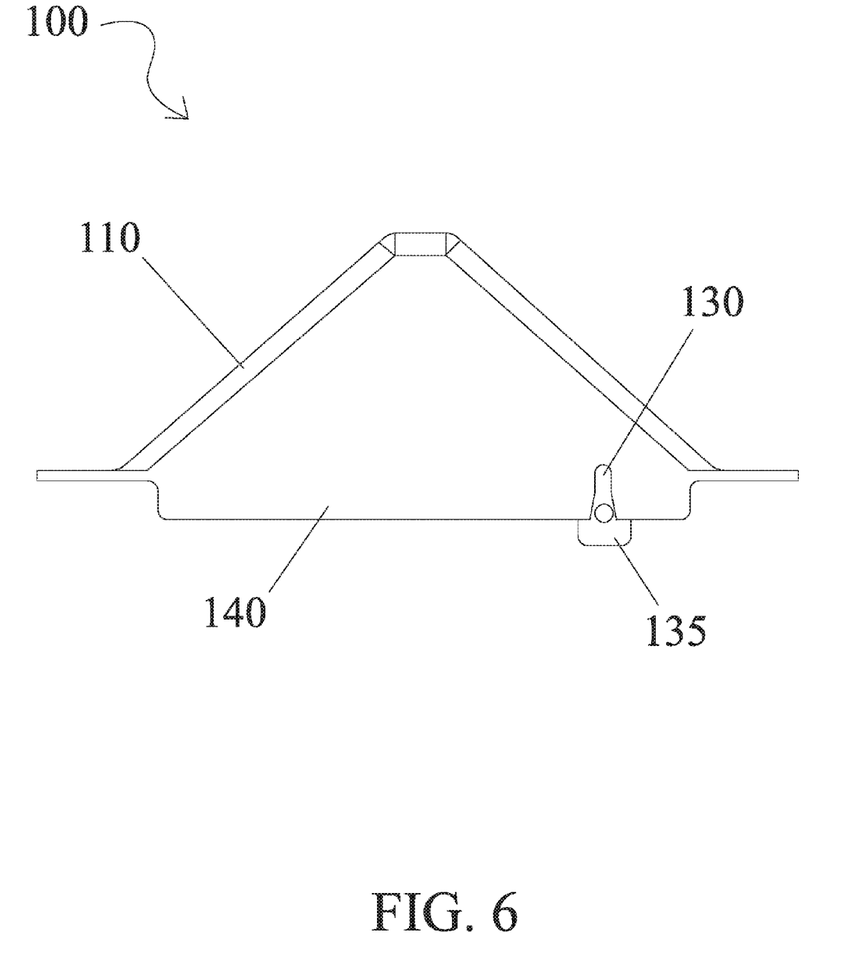
FIG. 6 is a bottom view of the Frame Covering Device with Air Vents shown in FIG. 1.
Figure 7:
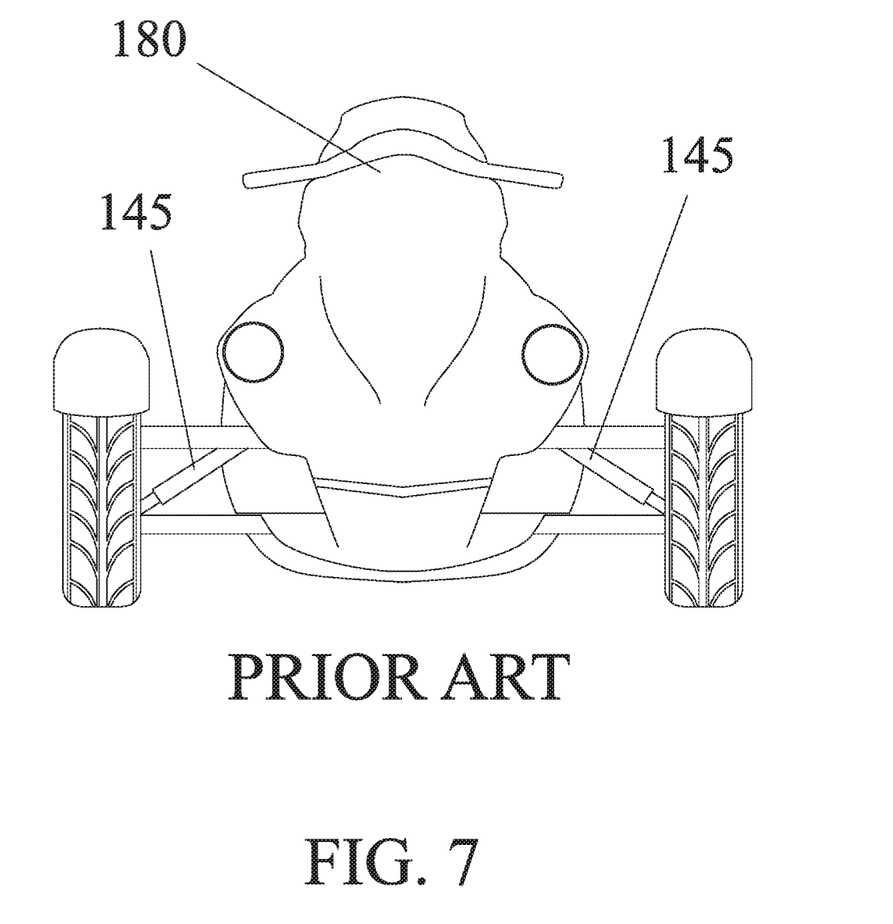
FIG. 7 is a front view of a typical prior art three-wheeled motorcycle.
Figure 8:
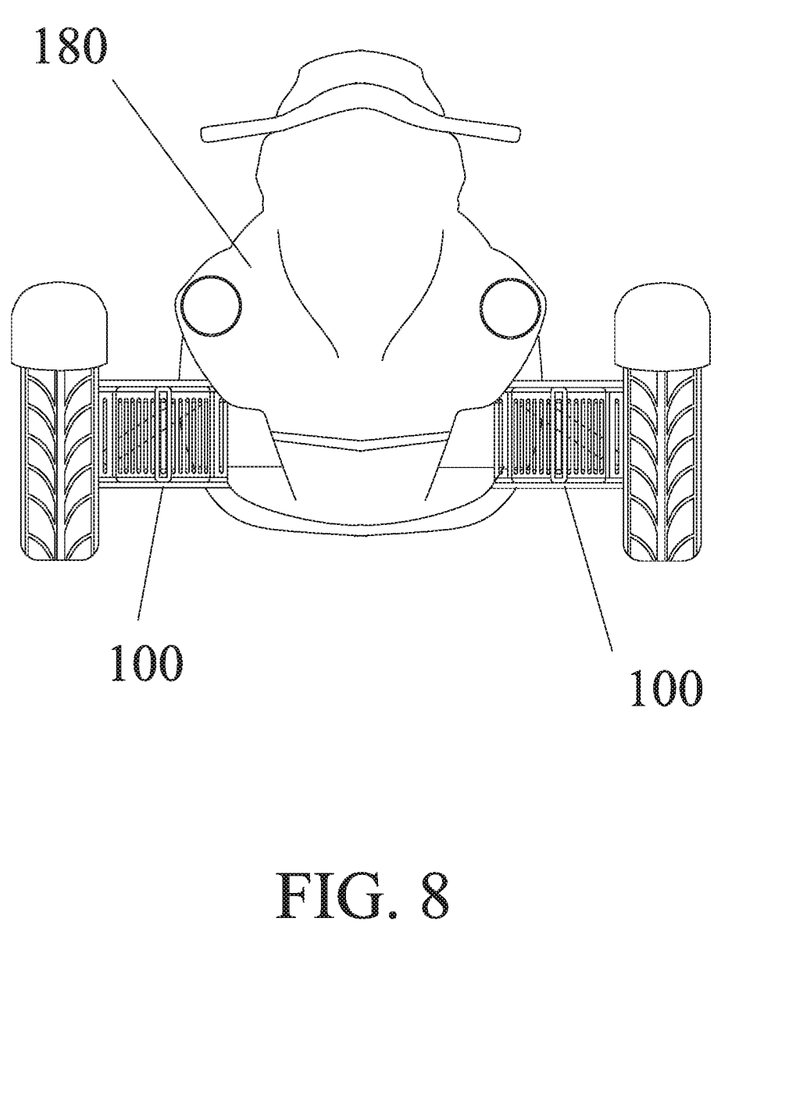
FIG. 8 is a front illustrative view of a typical three-wheeled motorcycle with the Frame Covering Device with Air Vents installed thereon.

As is illustrated in FIG. 1 through 6, the present invention includes frame covering device with air vents 100 that is formed to fit between the angles of front shock and steering assembly 145. The present device may be attached to the frames by use of well known fastening methods; such as using bolts that hold other parts to front shock and steering assembly 145, clips that snap around the frame, thereby providing a protective covering for the front shock and steering assembly. Frame covering device with air vents 100 may be made from various types of metal, or a polymer such as plastic, and the like.

The frame cover may be made to a specified size, with bolt holes drilled into the frame cover. The frame cover may be aligned with the frame to where the bolts are already mounted on the double A-arm frame. An individual may then remove the bolts and move the frame cover into place, between the upper and lower double A-arm assembly and then replacing the bolts removed from the frame. This addition may happen in a seated position, lying down or best with the bike on a hoist. The present invention may be reduced to the size of an air vent in a home to direct air flow in multiple directions other than just straight out.

Air vents may be of various shapes to allow air to flow to the radiators, The present invention does not hinder the movement of any double A-arms, shocks or steering of the vehicle.

In certain embodiments, the present device may be used for three wheeled tricycles. A plasma cutter, a 3-D printer or one skilled in metal work may be used to shape the Frame Covering Device with Air Vents to the specified measurements of the particular item to be covered. Holes may be drilled into the frame covering so that the Frame Covering Device with Air Vents invention may be slid into place on the double A-arm frame and assembled within minutes. In certain embodiments, the present device may be used for three wheeled tricycles.

It should be understood, of course, that the foregoing relates to exemplary embodiments of the invention and that modifications may be made without departing from the spirit and scope of the invention as set forth in the following claims.

What is claimed is:

1. A frame covering device with air vents comprising:
an upper frame portion;
a lower frame portion;
a sheet of material having a plurality of air vents disposed between said upper frame portion and said lower frame portion;
an upper flange disposed along a top portion of said upper frame portion;
an attachment tab disposed on said upper flange;
said attachment tab having a hole disposed thereon adapted to attach to a front shock and steering assembly of a three-wheeled motorcycle;
a lower flange disposed along a lower portion of said lower frame portion;
an attachment slot disposed in said lower flange adapted to attach to said front shock and steering assembly;
said sheet of material being essentially perpendicular to said upper flange and said lower flange; and
said upper frame portion and lower frame portion each having an aerodynamic shape adapted to provide laminar airflow around and through said frame covering device with air vents.

2. The frame covering device with air vents of claim 1 wherein said frame covering device with air vents is made of sheet metal.

3. The frame covering device with air vents of claim 1 wherein said frame covering device with air vents is made of plastic.

4. The frame covering device with air vents of claim 1 wherein said plurality of air vents are vertically oriented.

* * * * *